United States Patent [19]
Yamazaki et al.

[11] Patent Number: 4,923,666
[45] Date of Patent: May 8, 1990

[54] METHOD OF INJECTION MOULDING

[75] Inventors: Kunio Yamazaki, Takatsuki; Tetsuzi Watanabe, Toyonaka, both of Japan

[73] Assignee: Cinpres Limited, Staffordshire, England

[21] Appl. No.: 187,309

[22] Filed: Apr. 28, 1988

[30] Foreign Application Priority Data

Apr. 28, 1987 [JP] Japan .................... 62-103227

[51] Int. Cl.$^5$ ................ B29C 45/34; B29D 22/00
[52] U.S. Cl. .................. 264/572; 264/328.12; 264/328.13; 425/812
[58] Field of Search ........... 264/572, 101, 102, 328.1, 264/328.12, 328.13; 425/437, 812

[56] References Cited

U.S. PATENT DOCUMENTS

| | | |
|---|---|---|
| 2,209,877 | 7/1940 | Ferngren . |
| 3,345,687 | 10/1967 | Marx ........................ 425/437 |
| 3,358,062 | 12/1967 | Lemelson . |
| 3,366,993 | 2/1968 | Lemelson . |
| 3,378,612 | 4/1968 | Dietz . |
| 3,793,415 | 2/1974 | Smith . |
| 4,033,710 | 7/1977 | Hanning . |
| 4,067,673 | 1/1978 | Hendry . |
| 4,101,617 | 7/1978 | Friederich . |
| 4,106,887 | 8/1978 | Yasuike et al. . |
| 4,115,491 | 9/1978 | Hanning . |
| 4,120,924 | 10/1978 | Rainville . |
| 4,129,635 | 12/1978 | Yasuike et al. . |
| 4,136,220 | 1/1979 | Olabisi .................. 264/572 |
| 4,140,672 | 2/1979 | Kataoka . |
| 4,155,969 | 5/1979 | Hendry . |
| 4,201,742 | 5/1980 | Hendry . |
| 4,234,642 | 11/1980 | Olabisi . |
| 4,247,515 | 1/1981 | Olabisi . |
| 4,390,486 | 6/1983 | Hendry et al. . |
| 4,474,717 | 10/1984 | Hendry . |
| 4,498,860 | 2/1985 | Gahan . |
| 4,555,225 | 11/1985 | Hendry . |
| 4,601,870 | 7/1986 | Sasaki . |
| 4,685,872 | 8/1987 | Erlenbach . |
| 4,685,881 | 8/1987 | Sasaki . |
| 4,740,150 | 4/1988 | Sayer . |

FOREIGN PATENT DOCUMENTS

| | | |
|---|---|---|
| 127961 | 12/1984 | European Pat. Off. . |
| 250080 | 12/1987 | European Pat. Off. . |
| 1929343 | 12/1970 | Fed. Rep. of Germany . |
| 2106546 | 8/1972 | Fed. Rep. of Germany . |
| 2655255 | 6/1977 | Fed. Rep. of Germany . |
| 2800482 | 1/1978 | Fed. Rep. of Germany . |
| 2256021 | 7/1975 | France . |
| 61-53208 | 2/1978 | Japan . |
| 54-123173 | 3/1978 | Japan . |
| 57-14968 | 3/1982 | Japan . |
| 59-19017 | 7/1982 | Japan . |
| 603072 | 7/1948 | United Kingdom . |
| 619286 | 4/1949 | United Kingdom . |
| 1318030 | 5/1973 | United Kingdom . |
| 2006668 | 5/1979 | United Kingdom . |
| 2122130 | 1/1984 | United Kingdom . |
| 2139549 | 11/1984 | United Kingdom . |
| 2158002 | 11/1985 | United Kingdom . |
| 2139548 | 11/1986 | United Kingdom . |

OTHER PUBLICATIONS

Plastics Technology, Swirl-Free Foam Parts, May 1976, pp. 33-36, Union Carbide.

(List continued on next page.)

Primary Examiner—Jeffery Thurlow
Assistant Examiner—Leo B. Tentoni
Attorney, Agent, or Firm—Beveridge, DeGrandi & Weilacher

[57] ABSTRACT

A resin moulding is produced by introducing molten synthetic thermoplastic resin into a mould cavity, sufficient to fill completely the mould cavity. Subsequently, during the cooling of the resin, pressurized gas is introduced into the resin within the mould cavity. The resin moulding cools and hardens in the mould cavity while the gas is maintained under pressure. The mould cavity is designed to manufacture mouldings with unevenly distributed thick walled sections connected to at least one gate for the introduction of the pressurized gas, which flows only within the resin forming the thick walled sections and immediately adjacent areas of the moulding thereby taking up the shrinkage in the resin.

5 Claims, 3 Drawing Sheets

OTHER PUBLICATIONS

Engineering & Processing News, Through-The-Nozzle Gas Injection Produces Class A Foam Parts, Mar. 1980, pp. 22–24, Asahi-Dow.
Machine Design, The Best of Two Worlds in Plastic Processing, Dec. 9, 1982, pp. 99–102.
Eureka Transfers Technology, Gas Injection Relieevs Moulding Stresses, Jun. 1985, p. 31.
Plastics Machinery and Equipment, Gas-Cored Injection Techniques Go into Production, Nov. 1985, p. 24.
Plastics Technology, New Automotive PP, HDPE Applications Tested in Europe, Nov. 1985, p. 106.
Modern Plastics, Process Molds Rigid, Smooth Parts that are Stress Free, Nov. 1985, p. 26.
British Newspaper Article, Plastics After Deal Clinched, by John Baker, Sometime prior to Oct. 1, 1985.
Applied Technology, Plastic Moulding Process Give More Design Freedom, single page, sometime in or before 1985.
Moulding System with Body Appeal, undated, source unknown.
Cinpres Presenation Summary Brochure, Controlled Internal Pressure Process ("CINPRES"), Sep./Oct. 1985.
Cinpres Brochure, Cost Saving with Cinpres.
European Plastics News, Advance Injection Moulding Process, Jun. 1985.
Plastics & Rubber Weekly, New Foam Process Hybrid is 'Biggest Boon Since Screw', Apr. 27, 1985, p. 18.
Cinpres News, Aug. 1987.
Hoechst Plastics, Injection Moulding of Thermoplastics, Dec. 1972.
Netstal, Setting Up for Injection, Feb. 1973.
Three CINPRES Sales Pamphlets.

METHOD OF INJECTION MOULDING

BACKGROUND OF THE INVENTION

1. Field of the Invention

This invention relates to a method of injection molding and moldings produced thereby.

2. Prior Art

The manufacture of various types of synthetic resin moldings is known using various suitable resin materials such as, for example, general purpose plastics, engineering plastics and thermoplastic resins and adopting appropriate molding methods such as, for example, compression molding, extrusion molding and injection molding. Due to the rapid penetration of electronic equipment e.g. facsimile terminals, word processors, small to medium size computers, and telecommunications terminals, there is an increasing demand for housings for this equipment made from synthetic resins. The advantages of housings made from synthetic resins are lighter weight and the possibility of one piece moldings. There is also a strong demand for larger size housings to be made in the form of synthetic resin moldings.

For such housings there is a requirement for a pleasing external appearance, with no appreciable inward bending, and a high molding accuracy with no appreciable outward bending. There is a strong requirement for lighter housings. Furthermore, it is desirable that the housings or other moldings do not require painting or other after treatments.

Various technologies for manufacturing moldings which meet these various requirements have already been proposed. For example, in order to manufacture lighter moldings, there exist well-known methods using synthetic resin materials in which a molten resin is mixed with a foaming agent and expanded moldings are produced by injection molding. It is, however, very difficult to manufacture thin walled moldings using these methods, and the external appearance of such moldings is poor. Various techniques have been proposed to compensate for this poor external surface appearance in which a hardened surface skin layer is formed and the inner section comprises an expanded layer. Other methods of manufacturing lighter moldings are also known in which hollow internal layers are introduced into the moldings. However, these methods are not appropriate for thin walled moldings. Also, the molding cycle is long and unsuitable for molding the above-mentioned housings.

Methods have also been proposed for producing hollow moldings in which the quantity of molten resin injected into the mold cavity is insufficient to fill the cavity and subsequently pressurized gas only or pressurized gas and molten resin are injected to fill the mold cavity. However, with these methods there is a tendency for the gas to pierce through the molten plastics surface. The formation of the desired molding is also hindered when gas only is injected under pressure and the injection of gas is not very carefully controlled. This lack of control renders these methods unsuitable for complex shaped moldings.

A method has been proposed in which the operating conditions are controlled so that molten resin and gas flow simultaneously into the mold space and hollow moldings are manufactured. However, even with this method gas will easily pierce the resin surface when, for example, resin materials are used which have a low viscosity in the molten state.

Ribs are frequently used as strengthening sections in order to allow a reduction in the wall thickness of moldings having a large surface area and to provide strength and rigidity to the resulting thin walls. However, it is well known that inward bending of the surface occurs in the ribbed sections of such moldings and the external appearance of these moldings is poor.

SUMMARY

According to the invention there is provided a method of producing resin moldings comprising introducing molten synthetic thermoplastic resin into a mold cavity, introducing pressurized gas into the resin, and allowing the resin molding to cool and harden in the mold cavity whilst maintaining the gas under pressure, the mold cavity being designed to manufacture moldings with unevenly distributed thick walled sections connected to at least one gate for the introduction of the pressurized gas, wherein the mold cavity is completely filled with the resin, and subsequently the pressurized gas is introduced into the resin within the mold cavity during the cooling of the resin, the gas flowing only within the resin forming the thick walled sections and immediately adjacent areas of the molding and thereby taking up the shrinkage in the resin.

Preferably the method includes maintaining the pressure of the gas within the gas filled sections during the cooling stage of the molding cycle until the molding can itself sustain the form dictated by the mold surface.

It is also preferred that the method includes venting the gas filled sections to the atmosphere before opening the mold.

The invention also provides a molding produced by the method as defined above.

DESCRIPTION OF THE PREFERRED EMBODIMENT

Figure 1:
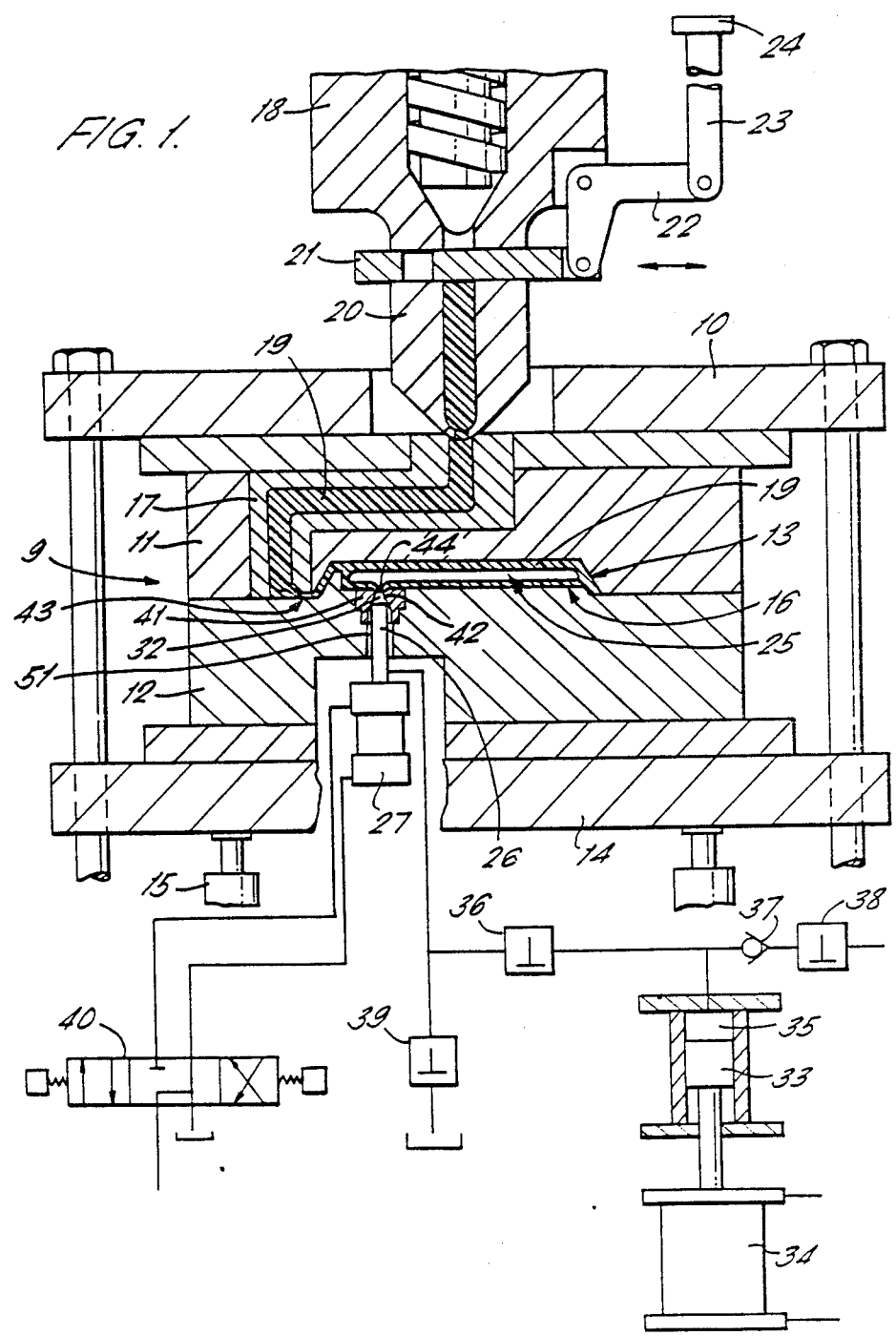
FIG. 1 shows an injection molding machine by way of example for producing injection moldings by a method in accordance with the invention.

This example is concerned with the production of moldings using molds which are designed to provide rib and/or boss structures. Molten synthetic resin is injected into the mold cavity and allowed to cool. Thus moldings are formed which contain ribs and/or bosses. When the above-mentioned moldings are formed using conventional injection molding, volumetric contraction of the resin occurs during the cooling stage of the process in which the resin inside the mold cavity hardens from the molten state. In particular inward bending of the surfaces of the moldings occurs on the rib or boss sections. One method of trying to prevent this type of bending is to maintain a high molten resin injection pressure during molding. However, this method of prevention is not satisfactory since, for example, cooling of the gate sections or thin walls near the gate sections occurs faster than in other areas, and thus the pressure effect does not adequately work on the desired sections. Conventional injection molding also gives rise to outward bending of the molding since even if the resin injection pressure is high around the gate, the pressure effect diminishes in relation to the distance from the gate, and this causes differences in volumetric contraction in proportion to differences in pressure effect.

The present invention provides a method of producing moldings which possess the above-mentioned rib structure and, if required, variable thickness wall sections such as boss structures or verticle pin sections. A metal mold is used which is designed to distribute and connect the thick walled sections, which correspond to the desired ribs, to the desired location from the gate section. The mold has a mold cavity which is filled with resin by injecting molten synthetic resin into the mold cavity. The resin within the mold cavity immediately starts to cool and shrink. During the cooling and shrinkage of the resin pressurized gas is injected into the mold cavity from the gate section. The injected pressurized gas passes from the point of injection at the gate section only through the center of the unevenly distributed thick walled sections and those areas immediately adjacent, which contain resin still in the molten state, and thus hollow sections are formed in the thick walled sections. The gas which fills the formed hollow sections is maintained under pressure, the mold itself cools and the resin is allowed to harden. The decrease in volume or shrinkage of the molding which corresponds to the volumetric contraction during cooling of the molten resin is displaced by the further introduction of the pressurized gas, the pressure of which is maintained during the cooling of the molten resin, and thus the shape of the molding is kept the same as the shape of the molding cavity. When the resin has cooled sufficiently for the molding to be capable of retaining the form dictated by the mold surface, the gas filled sections within the molding are vented by evacuating the gas to the atmosphere. The mold is then opened and the molding removed. By this method, the resulting molding possesses an excellent external appearance which is an exact copy of the surface of the molding cavity, and has minimal inward bending of the surfaces. Furthermore, since the passage of gas through the thick walled sections easily reaches the sections distant from the gate, without loss of pressure, the pressure effect of the gas reaches the whole of the molding, and thus practically no outward bending due to the volumetric contraction of the resin, is visible on the resulting moldings.

Compared with hitherto known methods in which an attempt to prevent outward bending is made by maintaining a high molten injection pressure, with the present invention it is not necessary to impose a high injection pressure on the molding equipment which would exert unreasonable mechanical stress. Also, since this invention only requires a low mold clamp pressure and deformation caused by differences in volumetric contraction of the resin during cooling is controlled, the cooling time for the resin in the molding cavity is reduced. Consequently this invention enjoys the advantage of a shorter molding cycle time compared with conventional injection molding cycle times. These advantages are extremely useful in practice.

There are no special restrictions on the thermoplastic resins which can be used with the method of the present invention. The method can be applied not only to general purpose plastics such as polyolefins, polystyrene, ABS resins, AS resins, PVC resins, methacrylic resins and fluorine based resins but also engineering plastics such as nylon, saturated polyester resins, polycarbonate resins, polyarylate resins, polyacetal resins, polysulfones, and modified polyphenylene ether resins. The method can also be applied to fiber strengthened resins.

In the realization of this invention, conditions such as the temperature of the molten resin during injection molding, the injection pressure, and injection speed; the injection gas timing, quantity, pressure and speed; and the mold cooling time, will be selected and controlled in relation to the kind of resin being used and the shape of the mold cavity, and thus cannot be unconditionally specified.

Inert gases should be used for the injection gas, and the preferred gas is nitrogen.

For some moldings it is convenient to introduce the gas through an outlet within the resin injection nozzle, for example, as described in British Patent No. 2139548. In other cases, the gas may be introduced at a separate position from the resin which is described in detail in British Patent Application No. 8805719.

Similarly, there are several known methods for performing the step of venting the gas filled sections within the molding before opening the mold. For example, the gas filled sections may be opened to the atmosphere by withdrawing either the resin injection nozzle or the gas injection nozzle. Alternatively valve means may be provided at the point of gas entry or gate section which are closed during introduction of the gas and can be opened for venting the hollow sections. Again suitable valve means are described in detail in British Patent Application No. 8805710. A further known method described in British Patent Application No. 8722620 involves a vent pin insert in the mold which can be withdrawn to open the gas filled sections to the atmosphere. In some cases withdrawal of the pin may pull or fracture a piece of the molding thereby creating an outlet through which the gas may pass to the atmosphere.

It will be appreciated that it is possible to obtain high precision moldings with minimal inward bending of the unevenly distributed thick walls due to volumetric contraction, and minimal outward bending due to deformation. Also, as was mentioned above, it is possible with the present invention to reduce the molding cycle time and to reduce the molding costs compared to conventional injection molding. Consequently, the method of the present invention is extremely appropriate for moldings which require a large surface area and thin walled sections, in particular, for the molding of housings. However, the invention is not restricted to the production of housings, but can be used for other synthetic resin moldings which have boss structures or vertical pin structures.

Referring to the drawings, FIG. 1 shows one example of apparatus which is described in detail in British Patent Application No. 8805719 and which can be employed to produce injection moldings by the method of the invention. In that apparatus, a mold 9 of an injection molding machine has upper and lower parts 11, 12 defining a mold cavity 13 of complex design and incorporating a rib 16. The mold parts 11, 12 are mounted between a fixed upper platen 10 and a lower platen 14 movable by a hydraulic ram 15. Also, in this embodiment, within the upper mold part 11 is a hot runner manifold 17 leading to a desired point of entry or opening 43 to the mold cavity 13.

A screw ram 18 is provided for introducing molten thermoplastics resin 19 through a nozzle assembly 20 to the hot runner manifold 17 and hence through the opening 43 to fill the mold cavity 13. The nozzle assembly is provided with a shut-off slide valve 21 actuated by a bell-crank lever 22 and a link 23 connected to a hydraulic cylinder 24. The valve 21 is shown in its closed position at the end of that part of the molding cycle which includes the introduction of the molten resin. The closed valve 21 prevents any return movement of the resin to the barrel of the screw ram 18. The screw ram may then be refilled with resin in preparation for the next molding cycle.

The passageway through which pressurized gas is introduced to create a gas containing hollow 25 in the molten resin 19, as the resin cools and tends to shrink, is the bore 28 of a retractable nozzle or valve member 26 connected to the piston 29 of a hydraulic or pneumatic cylinder 27. The downstream end of the nozzle 26 is located at a separate opening 44 in the mold cavity and contains a non-return valve comprising a ball held captive by a screw-on cap. Pressurized gas is supplied to the upstream end of the nozzle 26 from a chamber 35 by a piston and cylinder 33, 34, the chamber 35 holding a measured amount of gas, e.g. nitrogen, which it is required to introduce into the molten resin. The chamber 35 is connected to the nozzle 26 via a solenoid operated valve 36, and to a gas supply (not shown) via a non-return valve 37 and a pressure regulator 38. Downstream of the valve 36, the connection has a feed to waste via another solenoid operated valve 39.

The piston and cylinder 29, 27 is controlled via a solenoid operated valve 40 by control means (not shown) to move the nozzle 26 between a forward position, as shown, and a withdrawn position. In the forward position, the nozzle 26 is in sealing engagement with a conical valve seat of a valve port 42 opening directly into the mold cavity at the opening 44 and provided, in this embodiment, by an insert 41 in the lower mold part 12. The pressure applied by the piston 29 is greater than the pressure applied by the molten resin within the mold cavity 13 and the back pressure of the gas which is creating the gas containing hollow 25. In the withdrawn or valve port open position of the nozzle 26, gas pressure within the hollow is relieved through the opening 44, i.e. gas from the hollow readily passes through the valve port 42 into a second passageway 51 surrounding the nozzle 26 to the atmosphere. The non-return valve in the nozzle 26 prevents the gas returning back along the bore of the nozzle.

At the start of the molding cycle the nozzle or valve member 26 is held forward under pressure by the piston and cylinder 29, 27 thereby closing the valve port 42. The screw ram 18 contains molten resin and the slide valve 21 is open. The chamber 35 is also filled with the measured quantity of pressurized gas, and the valves 36 and 39 are both closed.

Operation of the screw ram 18 introduces the molten resin into the mold cavity 13 through the opening 43 via the hot runner manifold 17 until the cavity is filled. The slide valve 21 is then closed and the screw ram refilled with molten resin. The valve 36 is then opened and the piston and cylinder 33, 34 is operated to introduce gas through the nozzle 26 into the molten resin within the mold cavity thereby creating a gas containing hollow in the plastics material. The pressurization in the gas is maintained by the piston and cylinder 33, 34 whereby more pressurized gas is caused to enter the molten resin to take-up shrinkage in the resin ad it cools. The resin in the mold is thereby held positively against the mold surface as the resin solidifies and cools until the molding can itself sustain the form dictated by the mold surface.

The valve 36 is closed and the piston 33 withdrawn. The cylinder 34 is then refilled with another measured quantity of gas under pressure. The valve 39 is also opened and the gas downstream of the valve 36 in the connection to the nozzle 26 passes to waste.

Furthermore, the valve 40 is reversed so that the piston 29 withdraws the nozzle 26 and the gas in the gas containing hollow passes through the opening 44, the open valve port 42, and the second passageway 51, around the nozzle 26 to the atmosphere thereby venting the gas pressure in the hollow 25 to the atmosphere. The mold 10 is then opened and the molding removed. Finally the piston and cylinder 29 is operated to return the nozzle 26 to its forward position to await the introduction of molten resin during the next molding cycle.

Figure 2:
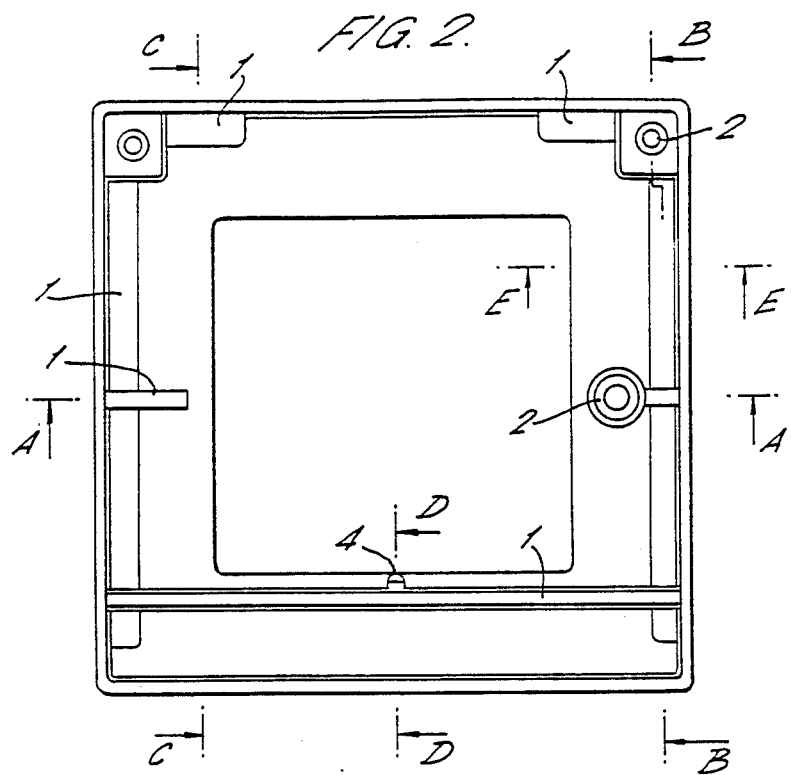
FIG. 2 is a plan view of an injection molding produced employing a method in accordance with the invention.
Figure 3:
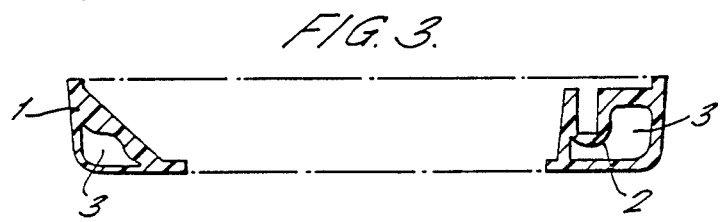
FIG. 3 is a section along line A—A in FIG. 2.
Figure 7:
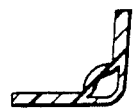
FIG. 7 is a section along line E—E in FIG. 2.
Figure 4:
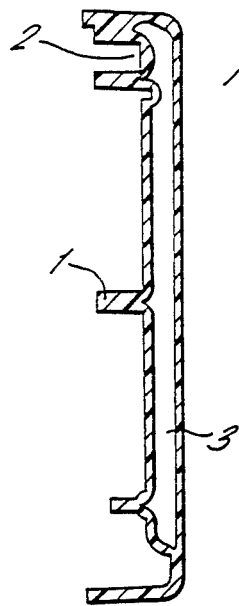
FIG. 4 is a section along line B—B in FIG. 2.
Figure 5:
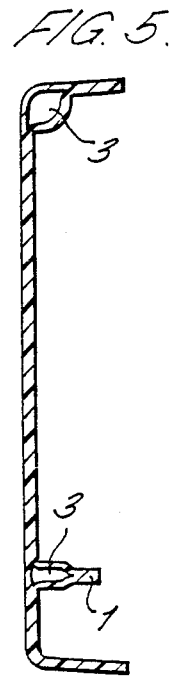
FIG. 5 is a section along line C—C in FIG. 2.
Figure 6:
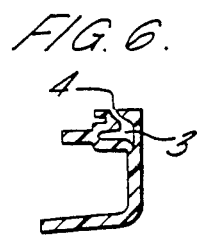
FIG. 6 is a section along line D—D in FIG. 2.

FIGS. 2 to 4 of the drawings show one example of an injection molding of thermoplastics resin produced by the method of the present invention, the molding having an unevenly distributed arrangement of rib structures 1, and boss structures 2. The molding also has hollow sections 3 produced by injecting gas under pressure into the molten resin which has already filled the mold cavity. Both the molten resin and the pressurized gas are injected through the same gate section 4. The molding has practically no visible outward bending of the surfaces corresponding to the rib structures 1 and the boss structures 2. If desired, there may be provided more than one gate 4 for injection of the gas under pressure.

Two examples are described below of the present invention being employed to produce moldings, as well as comparative examples using conventional injection molding. The pressures used are gauge pressures.

EXAMPLE 1

The molding shown in FIGS. 2 to 4 was produced using polycarbonate resin (manufactured by Mitsubishi Gas/Chemicals Co., Ltd. and sold under the trade name "YUPIRON S-3000") as the thermoplastic resin. The resin was melted at 300° C. in the cylinder of an injection molding unit. The plasticized polycarbonate resin was injected into the mold cavity through the gate 4 with an injection pressure of 28 kg/sq.m to fill the mold cavity. After 2 seconds pressurized nitrogen gas was injected through the same injection inlet gate 4 at 30 kg/sq.m. The mold cooled and after 45 seconds the internal pressure in the hollow sections 3 was relieved by venting the gas therein to the atmosphere. The mold was then opened and the molding removed. The weight of the molding was 373 g, the outward bending was 0.1 mm, and the inward bending was 0.1 mm. The molding was of excellent appearance with practically no sign of inward or outward bending.

COMPARATIVE EXAMPLE 1

For comparison purposes, moldings were produced using the same operations described in the above Example 1, except that pressurized nitrogen gas was not injected. However, the injection pressure of the molten resin was raised to 81 kg/sq.cm and the cooling period was extended to 65 seconds. The weight of the resulting molding was 440 g, the outward bending was 0.6–0.8 mm, the inward bending was 1.0–1.2 mm, and the rib and boss sections exhibited clear inward bending.

EXAMPLE 2

A rubber-modified polystyrene resin (manufactured by Mitsubishi Monsanto Chemical Co., Ltd. and sold under the trade name "Dialex HT-88") was used as the thermoplastic resin, and all the operating conditions were the same as the above Example 1, except that the resin temperature in the cylinder was 230° C. The weight of the molding obtained was 232 g, the outward bending was 0.2–0.3 mm, the inward bending was 0.1–0.2 mm, and again practically no outward or inward bending could be seen on the molding.

COMPARATIVE EXAMPLE 2

The above Example 2 was repeated except that pressurized gas was not injected, the resin injection pressure was 65 kg/cu.cm, and the cooling time was again extended to 65 seconds. The weight of the resulting molding was 391 g, the outward bending was 0.8–0.9 mm, the inward bending was 1.9–2.1 mm, and both inward and outward bending were clearly visible.

As will be appreciated from the above described examples, minimal outward and inward bending is obtained in the moldings when using the method of the present invention. Also, the hollow sections extend throughout the whole of the molding in unevenly distributed wall sections which contain rib and boss sections.

We claim:

1. A method of producing a resin molding comprising introducing molten synthetic thermoplastic resin at an elevated temperature in a mold cavity defining the shape of a resultant molding, introducing pressurized gas into the resin, and allowing the resin molding to cool and harden in the mold cavity whilst maintaining the gas under pressure, the mold cavity being designed to manufacture moldings with unevenly distributed thick-walled sections connected to at least one gate for the introduction of the pressurized gas, wherein the process comprises filling the mold cavity to its full capacity with the resin and, subsequent to the filling and whilst the resin of the molding cools from said elevated temperature and tends to shrink within the mold cavity, introducing the pressurized gas into the resin within the mold cavity, the gas flowing only within the resin forming the thick-walled sections and immediately adjacent areas of the molding, the gas entering said thick-walled sections and thereby taking up the shrinkage in the resin and forming gas-filled sections within the resin, and the pressure of the gas within the gas-filled sections being maintained during the cooling stage of the molding cycle until the molding can itself sustain the form dictated by the mold surface.

2. A method as claimed in claim 1, including subsequently venting the gas-filled sections to an area external to said mold before opening the mold.

3. A method of producing a resin molding comprising the steps of:
   introducing molten synthetic thermoplastic resin into a mold cavity with the mold cavity including cavity areas for defining a resultant shape of a molding having unevenly distributed thick-walled sections connected to at least one gate;
   completely filling to full capacity the mold cavity with the molten synthetic thermoplastic resin;
   introducing pressurized gas through the gate subsequent to the complete filling of the mold cavity with resin and prior to any significant cooling of the resin such that the pressurized gas flows within the resin to displace areas of the resin subject to volumetric contraction and whereby the pressurized gas flows only within the resin forming the thick-walled sections and immediately adjacent areas of the molding which contain resin in the molten state so a to form gas-filled sections in the thick-walled sections where there previously was only resin;
   maintaining the pressure of the introduced gas within the resin until the molding can itself sustain the form dictated by the mold.

4. A method as claimed in claim 3, including venting the introduced pressurized gas within the resin to an area external to said mold after the molding can sustain the form dictated by the mold and before opening of the mold.

5. A method as recited in claim 3, wherein the thermoplastic resin is introduced at a first pressure and the pressurized gas is introduced at a second pressure which is greater than said first pressure.

* * * * *

UNITED STATES PATENT AND TRADEMARK OFFICE
CERTIFICATE OF CORRECTION

PATENT NO. : 4,923,666
DATED : May 8, 1990
INVENTOR(S) : Yamazaki, et al.

It is certified that error appears in the above-identified patent and that said Letters Patent is hereby corrected as shown below:

Column 7, line 11, change "232" to --332--.

Signed and Sealed this

Eighth Day of December, 1992

Attest:

DOUGLAS B. COMER

*Attesting Officer*     *Acting Commissioner of Patents and Trademarks*

REEXAMINATION CERTIFICATE (2478th)
United States Patent [19]
Yamazaki et al.

[11] B1 4,923,666
[45] Certificate Issued Feb. 14, 1995

[54] METHOD OF INJECTION MOULDING

[75] Inventors: Kunio Yamazaki, Takatsuki; Tetsuzi Watanabe, Toyonaka, both of Japan

[73] Assignee: Cinpres Limited, Staffordshire, England

Reexamination Request:
No. 90/003,338, Feb. 22, 1994

Reexamination Certificate for:
Patent No.: 4,923,666
Issued: May 8, 1990
Appl. No.: 187,309
Filed: Apr. 28, 1988

Certificate of Correction issued Dec. 8, 1992.

[30] Foreign Application Priority Data
Apr. 28, 1987 [JP]  Japan ................ 62-103227

[51] Int. Cl.⁶ ............... B29C 45/34; B29D 22/00
[52] U.S. Cl. ..................... 264/572; 264/328.12; 264/328.13; 425/812
[58] Field of Search ........... 264/328.8, 328.12, 328.13, 264/572; 425/130, 542, 812

[56] References Cited

U.S. PATENT DOCUMENTS
4,601,870  7/1986  Sasaki ........................... 264/572
4,824,732  4/1989  Hendry et al. .................. 428/542.8

FOREIGN PATENT DOCUMENTS
2158002  11/1985  United Kingdom .

OTHER PUBLICATIONS
Modern Plastics Encyclopedia, Dec. 1992, pp. 250, 272.

*Primary Examiner*—Leo B. Tentoni

[57] ABSTRACT

A resin moulding is produced by introducing molten synthetic thermoplastic resin into a mould cavity, sufficient to fill completely the mould cavity. Subsequently, during the cooling of the resin, pressurized gas is introduced into the resin within the mould cavity. The resin moulding cools and hardens in the mould cavity while the gas is maintained under pressure. The mould cavity is designed to manufacture mouldings with unevenly distributed thick walled sections connected to at least one gate for the introduction of the pressurized gas, which flows only within the resin forming the thick walled sections and immediately adjacent areas of the moulding thereby taking up the shrinkage in the resin.

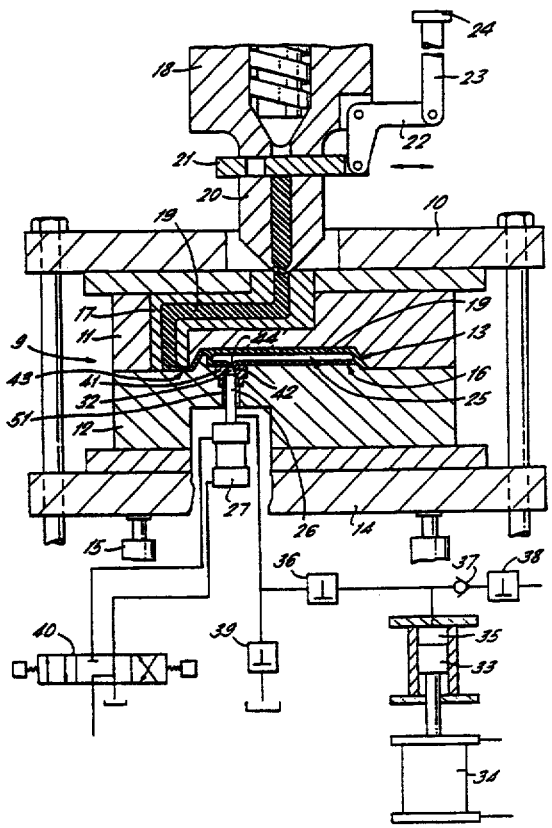

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-5 is confirmed.

* * * * *